(12) United States Patent
Zimmer et al.

(10) Patent No.: US 9,594,927 B2
(45) Date of Patent: Mar. 14, 2017

(54) PROVIDING A TRUSTED EXECUTION ENVIRONMENT USING A PROCESSOR

(71) Applicant: Intel Corporation, Santa Clara, CA (US)

(72) Inventors: Vincent J. Zimmer, Federal Way, WA (US); Peter J. Barry, Arndcrusha (IE); Rajesh Poornachandran, Portland, OR (US); Arjan Van De Ven, Portland, OR (US); Peter A. Dice, Chandler, AZ (US); Gopinatth Selvaraje, Portland, OR (US); Julien Carreno, Ennis (IE); Lee G. Rosenbaum, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 14/482,136

(22) Filed: Sep. 10, 2014

(65) Prior Publication Data

US 2016/0070932 A1    Mar. 10, 2016

(51) Int. Cl.
*G06F 21/72*    (2013.01)
*H04L 9/08*    (2006.01)
(Continued)

(52) U.S. Cl.
CPC ............ *G06F 21/72* (2013.01); *G06F 21/575* (2013.01); *G06F 21/79* (2013.01); *H04L 9/0861* (2013.01); *H04L 9/0894* (2013.01); *G06F 2221/033* (2013.01); *G06F 2221/2107* (2013.01); *G06F 2221/2111* (2013.01); *H04L 2209/60* (2013.01)

(58) Field of Classification Search
CPC ........ G06F 21/575; G06F 21/72; G06F 21/79; G06F 2221/033; H04L 2209/60; H04L 9/0861; H04L 9/0894
See application file for complete search history.

(56) References Cited

U.S. PATENT DOCUMENTS 8,117,642 B2    2/2012    Covey et al.
8,261,063 B2    9/2012    Proudler
(Continued)

OTHER PUBLICATIONS

International Searching Authority, "Notification of Transmittal of the International Search Report and the Written Opinion of the International Searching Authority," mailed Nov. 9, 2015, in International application No. PCT/US2015/042436.

(Continued)

*Primary Examiner* — Thomas Lee
*Assistant Examiner* — Chad Erdman
(74) *Attorney, Agent, or Firm* — Trop. Pruner & Hu, P.C.

(57) ABSTRACT

In an embodiment, a system on a chip includes: a single core to execute a legacy instruction set, the single core configured to enter a system management mode (SMM) to provide a trusted execution environment to perform at least one secure operation; and a memory controller coupled to the single core, the memory controller to interface with a system memory, where a portion of the system memory comprises a secure memory for the SMM, and the single core is to authenticate and execute a boot firmware, and pass control to the SMM to obtain a key pair from a protected storage and store the key pair in the secure memory. Other embodiments are described and claimed.

18 Claims, 6 Drawing Sheets

(51) Int. Cl.
   *G06F 21/79*   (2013.01)
   *G06F 21/57*   (2013.01)

(56) References Cited

U.S. PATENT DOCUMENTS

| | | | |
|---|---|---|---|
| 8,312,258 B2 | 11/2012 | Xing et al. | |
| 8,522,066 B2 | 8/2013 | Zimmer et al. | |
| 9,268,941 B1* | 2/2016 | Akdemir | G06F 21/572 |
| 2004/0151319 A1* | 8/2004 | Proudler | G06F 21/33 380/277 |
| 2007/0297606 A1* | 12/2007 | Tkacik | G06F 21/31 380/239 |
| 2009/0240923 A1* | 9/2009 | Covey | G06F 9/30167 712/220 |
| 2012/0042145 A1* | 2/2012 | Sehr | G06F 12/1491 711/163 |
| 2012/0226915 A1 | 9/2012 | Zollinger et al. | |
| 2014/0095890 A1 | 4/2014 | Mangalore et al. | |
| 2014/0189853 A1 | 7/2014 | Epp et al. | |
| 2014/0208123 A1* | 7/2014 | Roth | G06F 21/602 713/189 |
| 2014/0344889 A1* | 11/2014 | Lee | G06F 21/54 726/1 |
| 2015/0154031 A1* | 6/2015 | Lewis | G06F 9/4406 713/2 |
| 2015/0229471 A1* | 8/2015 | Nair | H04L 9/0822 713/171 |
| 2015/0356299 A1* | 12/2015 | Barkelew | G06F 21/575 713/2 |

OTHER PUBLICATIONS

Intel, "Intel® Quark SoC X1000 Secure Boot, Programmer's Reference Manual (PRM)," Mar. 2014, 57 pages.
Intel, "Product Brief Intel® Quark SoC X1000," 2013, 2 pages.
Information Week, Dark Reading, "BIOS Bummer: New Malware Can Bypass BIOS Security," May 23, 2013, 3 pages.
U.S. Appl. No. 14/472,645, filed Aug. 29, 2014, entitled, "Pairing Computing Devices According to a Multi-Level Security Protocol," by Abhilasha Bhargav-Spantzel.
Wikipedia.org, "IEEE 802.11i-2004," Downloaded Aug. 6, 2014, 5 pages.
Frank McKeen, et al., Innovative Instructions and Software Model for Isolated Execution, 2013, 8 pages.
Matthew Hoekstra, et al., "Using Innovative Instructions to Create Trustworthy Software Solutions," 2013, 8 pages.
Ittai Anati, et al., "Innovative Technology for CPU Based Attestation and Sealing," 2013, 7 pages.

* cited by examiner

PROVIDING A TRUSTED EXECUTION ENVIRONMENT USING A PROCESSOR

TECHNICAL FIELD

Embodiments relate to providing security to computing devices.

BACKGROUND

As portable computing devices such as smartphones, tablets and so forth become more prevalent, security issues arise as users seek to perform financial or other commercial transactions using an untrusted device that may easily be snooped. In addition, some users desire to access secure digital content such as protected media content using a portable computing device. However, certain content mandates a secure environment before allowing access to the content. Again, an untrusted device may not enable access to such content.

DETAILED DESCRIPTION

Figure 1:
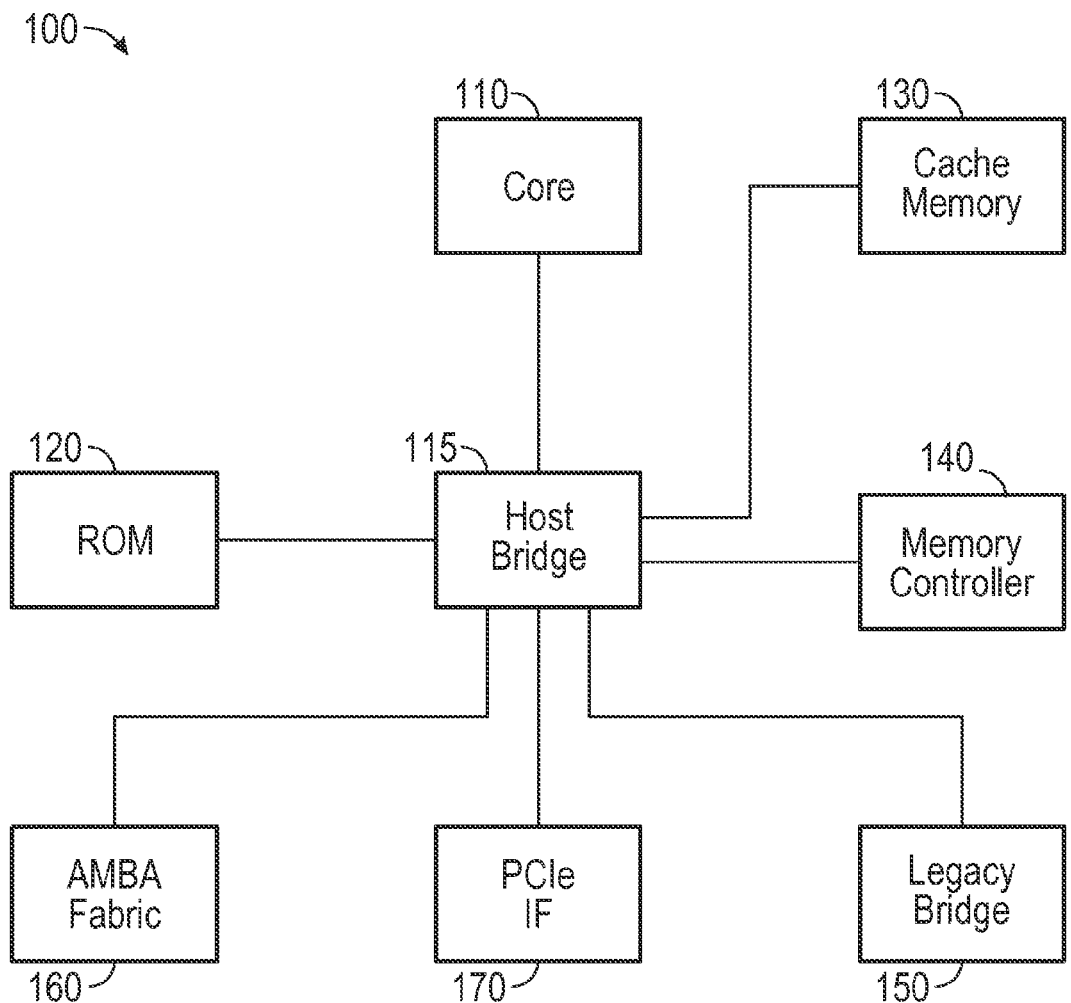
FIG. 1 is a block diagram of a processor in accordance with an embodiment of the present invention.

In various embodiments, a trusted execution environment (TEE) may be provided for a portable computing device, even where a central processor or system on chip (SoC) of such platform is of a low power, single core design that inherently does not have hardware capability (such as by way of security coprocessor, hardware trusted platform module (TPM) or so forth) for a secure environment. This TEE may be realized by a hardware/software co-design processor that provides combinations of hardware and software-based techniques for instantiating a TEE. Accordingly, using an embodiment of the present invention, a TEE may be created in a mobile platform to perform digital rights management (DRM), firmware TPM (fTPM) operations, one-time password (OTP), and other high assurance usages. Although the scope of the present invention is not limited in this regard, related and additional examples of secure operations include: creation and maintenance of a trusted path such as to provide a protected audio video path (PAVP); and creation and maintenance of a secure input/output path, among others.

Using an embodiment of the present invention, a TEE can be provided for a platform having a processor that does not have either: inherent security capabilities such as Intel® Software Guard Extensions (SGX) capabilities (by way of processor-internal hardware and extensions to a given instruction set (e.g., an Intel® Architecture (IA) 32 or 64 instruction set) via a microcode-based isolation mechanism to provide containers in a user environment); or dedicated security hardware resources such as a Converged Security Management Engine (CSME), which may itself be a coprocessor according to a given processor design such as an Intel® Minute IA design. Such coprocessor may not be suitable in given embodiments as the addition of another Minute IA core (in cases where the single core itself is a Minute IA core) would increase die size, power consumption and cost, which may dictate against use in various portable computing devices ranging from smartphones, tablet computers, wearables, embedded devices and so forth. Of course, embodiments are not limited to Intel®-based processors and are equally applicable to processors of other manufacturers or licensors such as processors having an ARM architecture such as Cortex-based processors or SoCs, or processors available from AMD Inc. or others.

Note that as used herein, a TEE thus includes both a hardware-based isolation mechanism and a software environment inside this hardware-protected domain. In an embodiment, a TEE may be provided within a system management mode (SMM) of a processor. More specifically, features of a boot read only memory (ROM) work in conjunction with the SMM to provide for a TEE in a SoC or other processor having minimal compute capabilities (such that a dedicated core, coprocessor, or other secure logic is not available for performing TEE creation and secure environment operations). To this end, a TEE may be provided in such processor using a combination of code or logic of the boot ROM to perform at least key storage, and access control logic to qualify access these boot ROM capabilities via a mechanism as described herein so that non-SMM code cannot access the boot ROM.

For the software mechanism inside the TEE, a virtual machine such as a Java™-like virtual machine and/or emulated SGX or 'eSGX' may be present in order to provide some degree of trusted software application compatibility. In an embodiment, entry into the TEE may be via a Global Platform (GP)-style application programming interface (API).

In general, SMM is a highest privilege execution mode that runs under ring 0/supervisor mode (or an IA VMX root). Entry into SMM may be triggered by a system management interrupt (SMI), in an embodiment. This trigger may be verified by a hardware isolation mechanism such as a system management mode range register, which may be configured to confirm valid access to a protected portion of system memory.

As an overall view, a TEE may be effected via boot ROM code (and secure key storage) and interaction between this code and SMM operations. During manufacturing time, an endorsement key (EK) key pair is generated and stored in boot ROM private resources such as a private isolated key store. Then during boot time, the boot ROM first guarantees that Uniform Extensible Firmware Interface (UEFI) firmware is authentic and then passes control to a UEFI SMM. In an embodiment, this firmware may be signed and cryptoverified such as done in a secure boot. Similarly, the EK from isolated storage, e.g., in the boot ROM, can be accessed and provided to the SMM. In turn, the SMM stores the keys and/or any derivatives in a protected portion of memory such as system management random access memory (SMRAM).

This memory may be reset (e.g., via zeroizing) across reboots and further may be isolated from host access. In this way, each boot provisions keying material into the SMM TEE from the boot ROM and its associated key store. In other embodiments, the key store may be located in another portion of the SoC such as field programmable fuses of the SoC. Note that in various embodiments, the key store and its constituent keys can be provisioned in the factory under a manufacturer authority, e.g., of the processor manufacturer or original equipment manufacturer (OEM) manufacturer. In some embodiments, additional keys such as for DRM usages (e.g., a Google Widevine key box) may be provisioned at manufacture or in the field by a user or information technology (IT) personnel.

Beyond a TPM, a SMM firmware driver may expose one or more Intel® SGX instructions to enter into SMM mode and provide software PAVP or secure input/output (IO) capability. For example, in such mode, the SoC can ensure that only a SMM TEE can communicate with a graphics processor of a peripheral device (e.g., a PCI device) by having the SMM code disable a device ID for this graphics device upon operating system (OS) reset so that the device is only visible to the SMM TEE, and thus the host/OS is not aware of this trusted video path. In an embodiment a SMM range register (e.g., one or more SMRRs) can protect at least certain portions of the firmware and provide secluded execution. In an embodiment, a SMM port trap allows the host to communicate to a SMM driver to enter/exit SMM mode. In summary, through this provisioning and I/O trap mechanism, a plurality of TEE-based applications—such as a TPM, DRM blackbox, and emulated or software SGX—can be implemented on a low power, low functionality processor or other SoC.

Referring now to FIG. 1, shown is a block diagram of a processor in accordance with an embodiment of the present invention. As seen in FIG. 1, processor 100 is an SoC that includes a single core 110. In various embodiments described herein, core 110 may be a low power and relatively simple processor core such as an in-order processor. As one such example, core 110 may be an Intel® Quark™ processor core. Such processor, in an embodiment is a single-threaded core configured to execute instructions of a legacy instruction set architecture such as a Pentium®-compatible ISA. As such, certain instructions available on more advanced processors (such as a processor based on an Intel® Core™ architecture), e.g., advanced vector instructions or advanced security instructions as available in an Intel® SGX environment, are not available for execution in core 110 per se.

Still referring to FIG. 1, core 110 couples to a host bridge 115, which may be an interface to various components of the SoC. As seen, host bridge 115 couples to an on-die boot read-only memory (ROM) 120 which in an embodiment may store code and key material as described herein. Host bridge 115 further couples to a cache memory 130, which in an embodiment may be an embedded a static random access memory (eSRAM). Host bridge 115 further couples to a memory controller 140 configured to interface with an off-chip memory such as a given system memory, e.g., a DRAM. Note that this DRAM may include a protected or secure portion such as a SMRAM used for secure operations as described herein.

In addition, host bridge 115 couples to various interfaces to off-chip devices. Such interfaces include a legacy bridge 150, from which interface to various off-chip components may occur. As examples, such off-chip components may include an external ROM and a platform management controller, among other off-chip devices. In addition, host bridge 115 further couples to a fabric 160 which in an embodiment may be an Advanced Microcontroller Bus Architecture (AMBA) fabric configured to interface to additional off-chip components, such as via an I²C interface, a USB interface, and an Ethernet interface, among others. In addition, host bridge 115 further couples to a PCIe interface 170 that in turn may interface with one or more off-chip PCIe devices. Understand while shown with these limited components in the embodiment of FIG. 1, the scope of the present invention is not limited in this regard and many alternatives and variations are possible.

Figure 2:
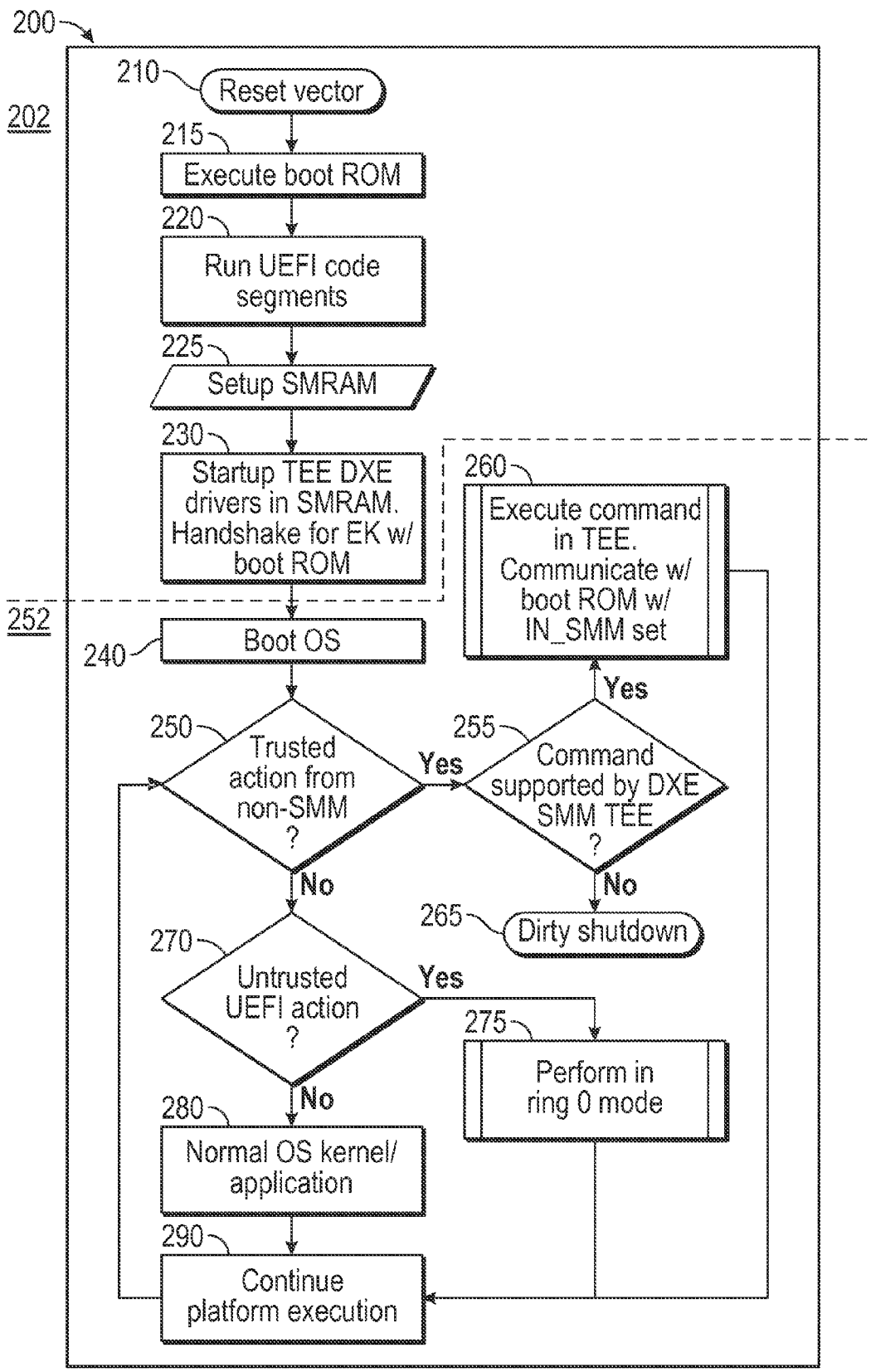
FIG. 2 is a flow diagram of a method in accordance with an embodiment of the present invention.

Referring now to FIG. 2, shown is a flow diagram of a method in accordance with an embodiment of the present invention. As shown in FIG. 2, portions of method 200 may be performed both on reset of a system including a TEE capability, as well as during normal operation of the system to perform one or more trusted operations to be executed within the TEE.

As seen, method 200 begins in a pre-boot environment 202 upon a reset vector (block 210), which may be a hardwired redirection responsive to reset of a system including an SoC to vector to a predetermined location in a firmware storage, also referred to herein as a boot ROM. Next, at block 215 such ROM execution may begin. Pre-boot may begin according to a root of trust from this hardcoded entry point. Although various operations may be performed upon beginning ROM execution, for purposes of embodiments described herein one such operation includes generation of an endorsement key pair (EK). In an embodiment, this key pair may be generated as to a Rivest Shamir Adleman (RSA) public/private key pair. This key pair may be stored in a given secure location such as a protected key store of the boot ROM. In an embodiment, this key pair may be generated during manufacturing of a system, and then the manufacturer could generate an EK certificate, which is then published.

Still referring to FIG. 2, next control passes to block 220 where various pre-boot code may be run. Although the scope of the present invention is not limited in this regard in a system providing UEFI code, this pre-boot code may include a security portion, pre-execution initialization code and a driver execution environment code (respectively SEC, PEI, and DXE).

Control next passes to block 225, where a protected portion of a system memory may be set up. In an embodiment, this protected portion of system memory is a SMRAM. Such SMRAM may be a partitioned portion of a system memory to which access is only allowed when the processor is in a SMM mode of operation. As one such example, access control hardware may protect this portion of system memory, e.g., via a set of memory range registers and access control logic to confirm that the processor is validly in an SMM before allowing access to the protected range.

On setting up this protected portion of system memory, control passes to block 230 where TEE drivers may be set up. In one embodiment, such drivers may include one or more TEE DXE drivers. In addition, a handshake protocol may be performed to obtain the previously generated key pair from the boot ROM and store such keys in the protected portion of system memory, e.g., SMRAM. In one embodiment an IN_SMM signal may be set to initiate the handshake to pass the keys into the SMRAM, where they may be hidden from the system outside of SMM, including the OS and any malware executing on the system.

At this point, a TEE has been set up, and pre-boot operations are completed. Accordingly control passes to a boot or OS environment 252 in which the OS is booted (block 240). During normal operation of the system in this environment, it can be determined, when a requested action is received, whether the action is a trusted action (namely a request for a trusted action) received during a non-SMM (diamond 250). In various embodiments, note that inputs and outputs can be trusted via drivers executed within the TEE. Examples of this trusted action request may be an OS request for a firmware TPM operation, which may trigger an SMI for SMM to be entered. As another example a Global Platform API may trigger a request for a trusted action, such as an OTP or a financial transaction.

If the action is a trusted action, control passes to diamond 255 to determine whether the command for the corresponding action is supported by the available trusted execution environment, which in an embodiment is a DXE SMM TEE. If the command is unsupported, control passes to block 265, where a dirty shutdown is performed. In an embodiment, a dirty shutdown includes an indication to a user of an unauthorized attempt to perform a trusted operation. In another embodiment, an LED indicator may blink to indicate the attempt. Or the platform can simply omit execution of the operation and return to appropriate return code such as "EFI_SECURITY_VIOLATION" in the case of an errant pre-OS UEFI caller.

Otherwise if the command is supported, control passes to block 260 where the command may be executed in the TEE. To enter into the TEE a SMM initiation signal is set, e.g., the IN SMM signal, to begin execution of the requested trusted operation in the SMM. Note that the desired operation may take many different forms of trusted operations. The result of the trusted operation may be placed into an unprotected memory such as RAM accessible to the OS. When such execution is completed, control passes to block 290 where, after termination of the TEE, e.g., exit of SMM via a resume (RSM) instruction occurs, continued platform execution may occur.

Still referring to FIG. 2 if instead at diamond 250 it is determined that a requested action is not a trusted action, control passes to diamond 270 where it is determined whether an untrusted UEFI action is requested. If so, control passes to block 275, where the operation may be performed in a supervisor mode, e.g., ring 0, for execution of the untrusted UEFI action, which may be performed using DXE code and/or ACPI code. If the requested action is not an untrusted UEFI action, control instead passes to block 280 for conventional non-privileged OS kernel/application processing. Although shown at this high level in the embodiment of FIG. 2, the scope of the present invention is not limited to this arrangement.

As discussed above, one example use case for a TEE in accordance with an embodiment is for handling protected digital content, e.g., having DRM management protection. Assume a user desires to download or stream and watch a movie or other video content via a content delivery service such as Netflix™. In such case, encrypted digital content is received in a system via a network connection. Note that the actual receipt is via an unencrypted channel, although the content itself is encrypted. To enable decryption of the content, a TEE is entered and secure keys are used in performing decryption operations. More specifically, the stored EK key pair may act as a key hierarchy root in order to generate a protected storage root key (SRK) secured in a secure storage and which is accessed in the TEE for deriving and accessing other keys such as content decryption keys. Stated another way, the EK key pair may be used for management of other keys such as keys used for content encryption/decryption.

To this end, assume that the user has previously performed an exchange process to obtain a set of keys for use with the Netflix™ service. More specifically, via the EK keys of the secure storage, a set of content decryption keys may themselves be encrypted and maintained in a non-secure storage such as a given non-volatile storage of the system, e.g., an unprotected flash memory of the system.

Then, when encrypted content is received while the system is in the TEE, these stored keys from the unprotected storage may be obtained and unwrapped using the protected EK keys. Then decryption operations can be performed on the content using these decrypted keys. After the content is decrypted, it may be sent via a secure channel to a destination, e.g., a local display coupled to the processor via a secure path (e.g., via an Intel® PAVP technology), where this secure path cannot be snooped by untrusted sources such as an untrusted OS or malware operating in the system. In an embodiment, the secure or trusted channel may be realized via a dedicated console driver in SMM to provide a trusted hardware path that communicates directly with a destination device, and does not use an OS display or other driver. In similar fashion, user or other input while in the TEE may also be via a trusted input path, as an input device driver may execute within SMM in the TEE, and thus avoid malware or untrusted OS input driver. Accordingly, secure content may be received and processed in a system with high assurance.

Figure 3:
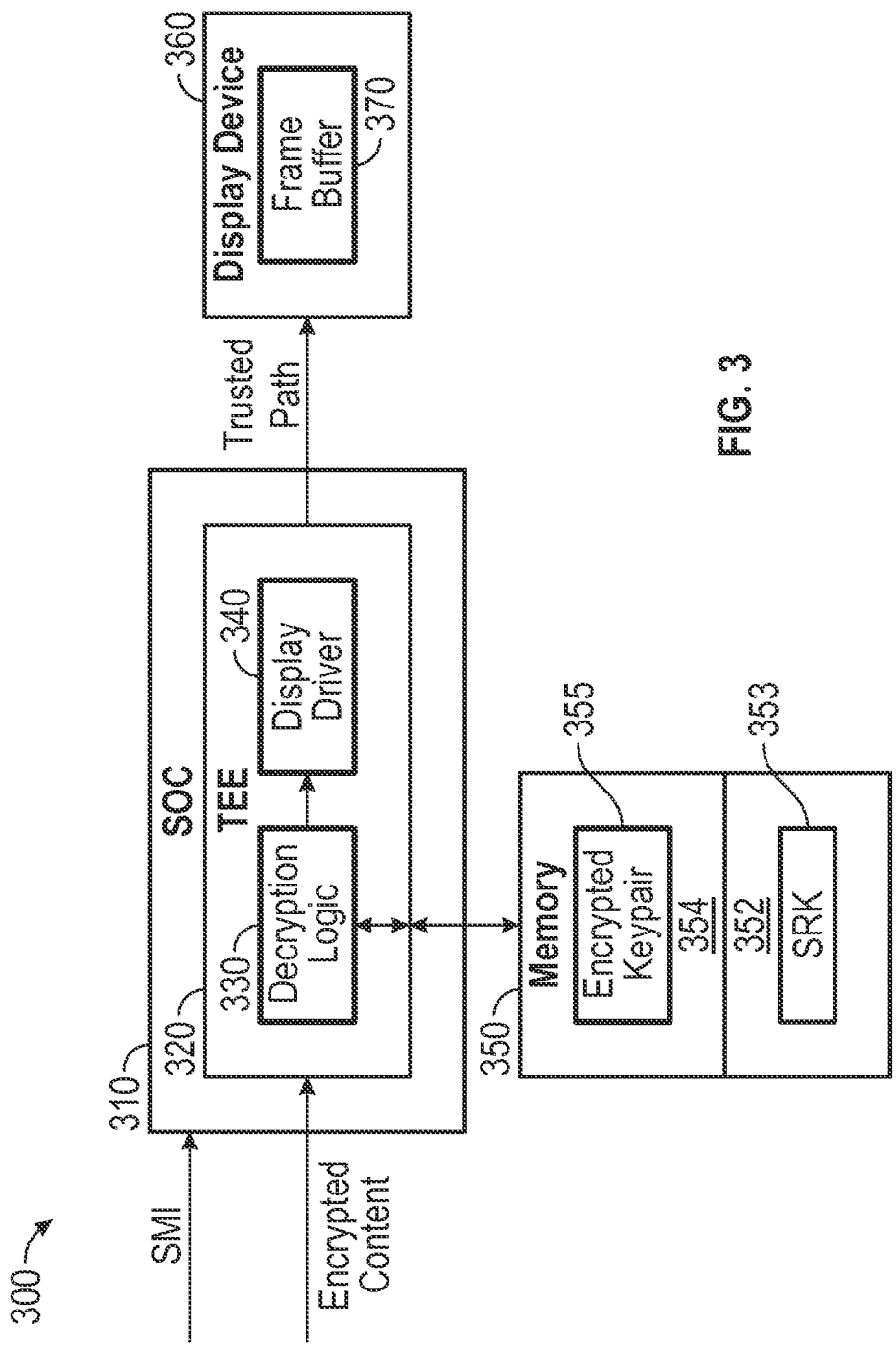
FIG. 3 is a block diagram of an arrangement used for handling protected digital content in an embodiment.

Referring now to FIG. 3, shown is a block diagram of an arrangement used for handling protected digital content in an embodiment. As shown in FIG. 3, a system 300 includes an SoC 310 coupled to a memory 350 which in an embodiment is a system memory including a secure portion (e.g., SMRAM) 352 and an unprotected portion 354. In addition, SoC 310 couples to a display device 360, which may be a touchscreen display or other display of the system.

Responsive to receipt of an SMI, SoC 310 enters into a TEE 320. For purposes of discussion herein, during execution within TEE 320, a decryption logic 330 operates to decrypt incoming encrypted content which may be any type of protected digital content such as secure video, audio or other protected information, which may be received via an unencrypted channel. To enable decryption logic 330 to decrypt the encrypted content, communication occurs between decryption logic 330 and memory 350, and more specifically to secure portion 352 to obtain SRK 353 and to unprotected portion 354 to obtain an encrypted key pair 355. In an embodiment, encrypted key pair 355 is a previously stored key pair associated with a provider of the content. To encrypt/decrypt this key pair stored in the unprotected memory, SRK 353 may be used. More specifically, SRK 353 may be an EK key pair, e.g., provisioned into SMRAM during initialization of the system (as obtained from a boot ROM). Using the keys of SRK 353, encrypted key pair 355 may be decrypted and the decrypted keys used for decryption in decryption logic 330 to output decrypted content.

As further illustrated in FIG. 3, TEE 320 further includes a display driver 340 which is a trusted and secure driver inaccessible to an OS or malware executing on the system. As such, a trusted path is provided between TEE 320 and display device 360. The decrypted content may be stored into a frame buffer 370 of the display device, which then outputs the decrypted content to the display. Understand while shown at this high level in the illustration of FIG. 3, the scope of the present invention is not limited in this regard and many variations and alternatives are possible.

Another use case may be for storage of encrypted pages in memory in the case where a protected memory, e.g., SMRAM, is insufficient for purposes of holding instructions and/or data during trusted operations in a TEE. That is, in many systems SMRAM is limited, e.g., to 8 megabytes (MB). In some cases, an SMM handler other secure code may consume more than this 8 MB limit and accordingly, code and/or data may be swapped between SMRAM and an unprotected memory. In this case, when encrypted pages are brought into SMRAM, the information may first be decrypted, using keys derived from the storage root key. And similarly, when the information is to be sent back out from the protected storage, the derived keys may again be used to encrypt the information before storage in the unprotected memory.

Figure 4:
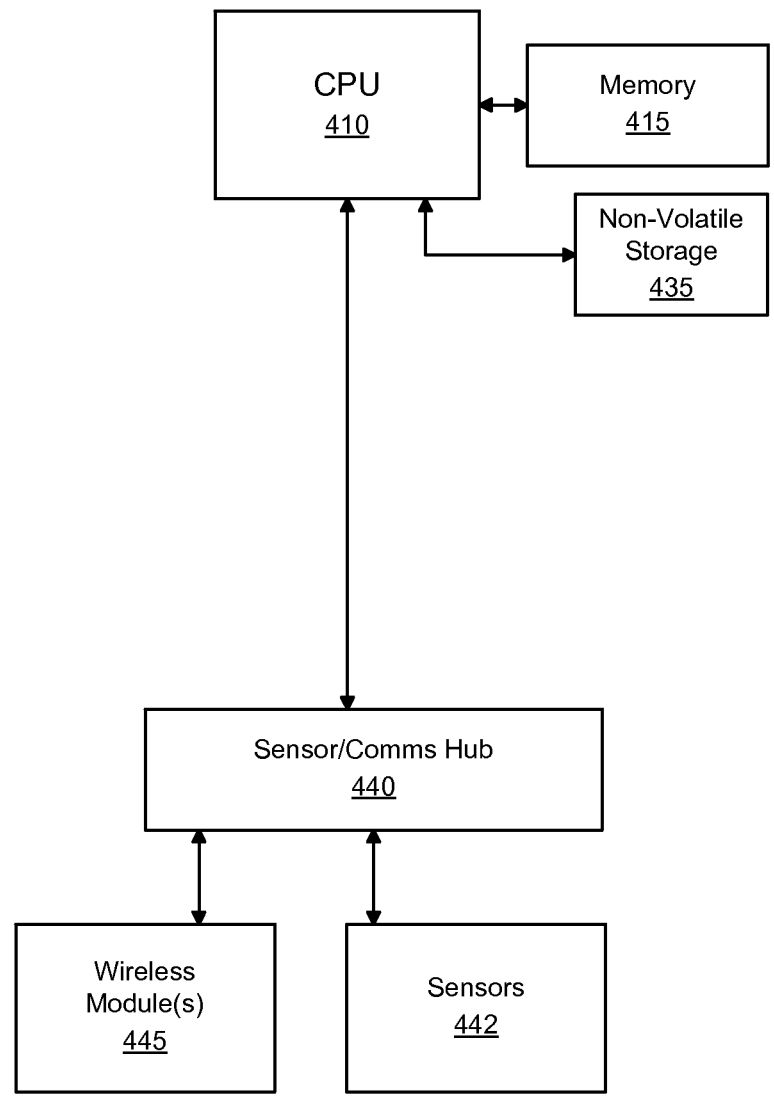
FIG. 4 is a block diagram of a system arrangement in accordance with an embodiment of the present invention.

Referring now to FIG. 4, shown is a block diagram of a system arrangement in accordance with an embodiment of the present invention. As seen in FIG. 4, system 400 may be an embedded device or wearable, and as such may be a headless system without a display in the example shown. A CPU 410 may be a SoC or other processor that has a single low power core as described herein, and is configured to execute in SMM to provide a trusted execution environment to be used for secure operations as described herein. In different embodiments, in the TEE a variety of secure operations may be performed, including emulation of Intel® SGX technology, Intel® TXT technology, or an ARM Trust-Zone.

As further seen, various portions of a memory system couple to CPU 410, including a system memory 415 (e.g., formed of dynamic random access memory (DRAM)) and a non-volatile storage 435, which may be a main mass storage of the system and may correspond, e.g., to a solid state drive. Note that system memory 415 may include SMRAM to store an EK (and derivatives) as described herein.

In the embodiment of FIG. 4, additional components may be present including a sensor/communications hub 440 coupled to CPU 410. Hub 440 may be a standalone hub or configured within CPU 440. As seen, one or more sensors 442 may be in communication with hub 440. For purposes of user authentication and device/context attestation, such sensors can include biometric input sensors, one or more capture devices, and a global positioning system (GPS) module or other dedicated location sensor. Other sensors such as inertial and environmental sensors also may be present. As several examples, an accelerometer and a force detector may be provided and information obtained from these sensors can be used in biometric authentications. Also, in various embodiments one or more wireless communication modules 445 may be present to enable communication with local or wide area wireless networks such as a given cellular system in accordance with a 3G or 4G/LTE communication protocol.

Figure 5:
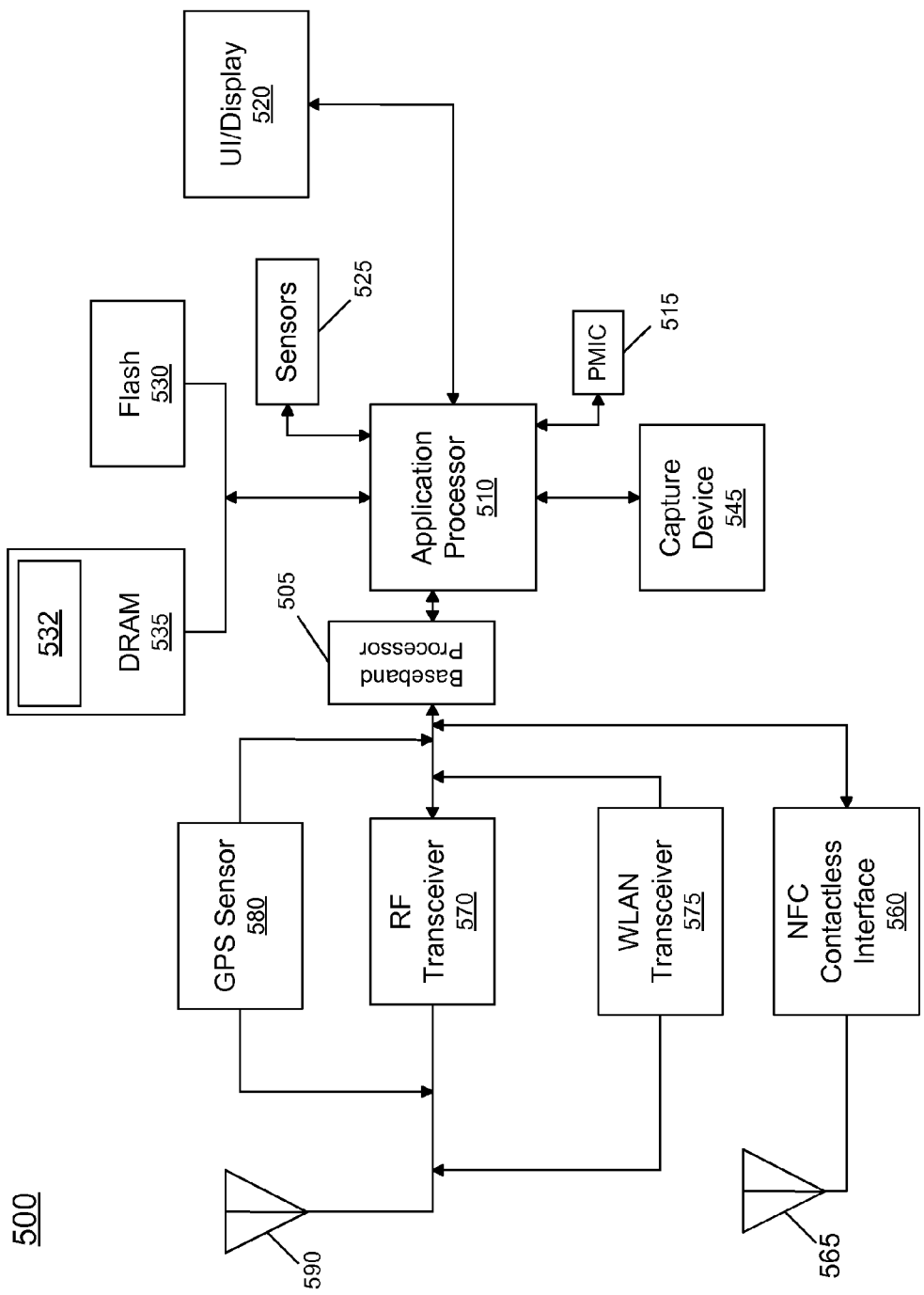
FIG. 5 is a block diagram of another example system with which embodiments can be used.

Note that embodiments are not limited to a headless system, and may be equally applicable to providing a trusted environment for secure operations in other devices. Referring now to FIG. 5, shown is a block diagram of another example system with which embodiments can be used. As seen, system 500 may be a smartphone or other wireless communicator. A baseband processor 505 is configured to perform various signal processing with regard to communication signals to be transmitted from or received by the system. In turn, baseband processor 505 is coupled to an application processor 510, which may be a main CPU of the system to execute an OS and other system software, in addition to user applications such as many well-known social media and multimedia apps. Application processor 510 may further be configured to enter a SMM to perform secure operations for the device, as described herein.

In turn, application processor 510 can couple to a user interface/display 520, e.g., a touch screen display. In addition, application processor 510 may couple to a memory system including a non-volatile memory, namely a flash memory 530 and a system memory, namely a DRAM 535.

In some embodiments, DRAM 535 may include a secure portion 532 in which secrets such as an EK and derived keys may be stored. As further seen, application processor 510 also couples to a capture device 545 such as one or more image capture devices that can record video and/or still images. A plurality of sensors 525 may couple to application processor 510 to enable input of a variety of sensed information such as accelerometer and other environmental information.

As further illustrated, a near field communication (NFC) contactless interface 560 is provided that communicates in a NFC near field via an NFC antenna 565. While separate antennae are shown in FIG. 5, understand that in some implementations one antenna or a different set of antennae may be provided to enable various wireless functionality.

A power management integrated circuit (PMIC) 515 couples to application processor 510 to perform platform level power management. To this end, PMIC 515 may issue power management requests to application processor 510 to enter certain low power states as desired. Furthermore, based on platform constraints, PMIC 515 may also control the power level of other components of system 500.

To enable communications to be transmitted and received, various circuitry may be coupled between baseband processor 505 and an antenna 590. Specifically, a radio frequency (RF) transceiver 570 and a wireless local area network (WLAN) transceiver 575 may be present. In general, RF transceiver 570 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 580 may be present, with location information being provided to security processor 550 for use as described herein. Other wireless communications such as receipt or transmission of radio signals, e.g., AM/FM and other signals may also be provided. In addition, via WLAN transceiver 575, local wireless communications, such as according to a Bluetooth™ or IEEE 802.11 standard can also be realized.

Figure 6:
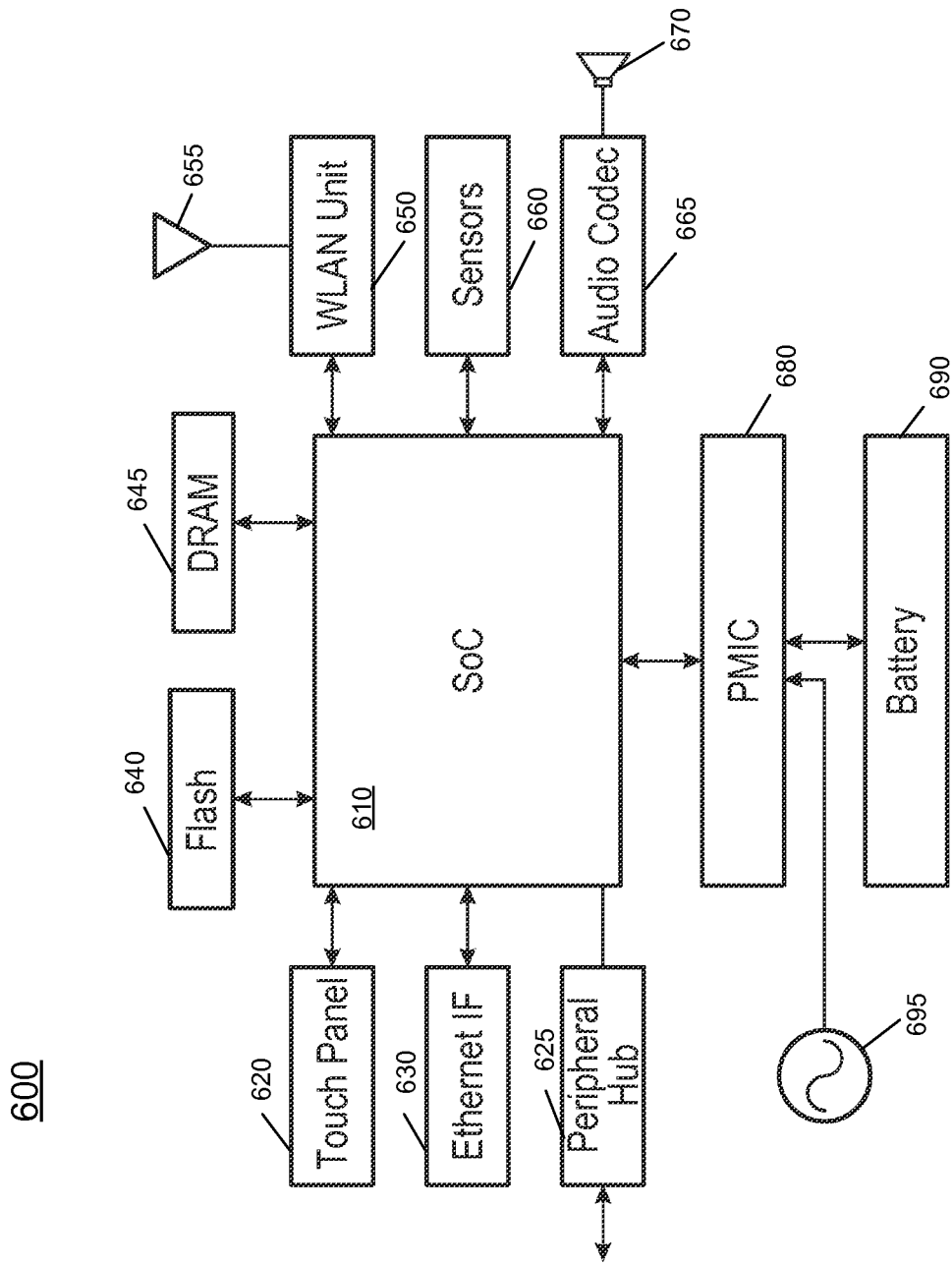
FIG. 6 is a block diagram of another example system with which embodiments may be used.

Referring now to FIG. 6, shown is a block diagram of another example system with which embodiments may be used. In the illustration of FIG. 6, system 600 may be mobile low-power system such as a tablet computer, 2:1 tablet, fablet or other convertible or standalone tablet system. As illustrated, a SoC 610 is present and may be configured to operate as an application processor for the device, and to enter into SMM to perform secure operations as described herein.

A variety of devices may couple to SoC 610. In the illustration shown, a memory subsystem includes a flash memory 640 and a DRAM 645 coupled to SoC 610. To this end, SoC 610 may include an integrated memory controller to handle communications with DRAM 645, and set up and protect a secure portion within this memory (e.g., SMRAM) as described herein. In addition, a touch panel 620 is coupled to the SoC 610 to provide display capability and user input via touch, including provision of a virtual keyboard on a display of touch panel 620. To provide wired network connectivity, SoC 610 couples to an Ethernet interface 630. A peripheral hub 625 is coupled to SoC 610 to enable interfacing with various peripheral devices, such as may be coupled to system 600 by any of various ports or other connectors.

In addition to internal power management circuitry and functionality within SoC 610, a power management integrated circuit (PMIC) 680 is coupled to SoC 610 to provide platform-based power management, e.g., based on whether the system is powered by a battery 690 or AC power via an AC adapter 695. In addition to this power source-based power management, PMIC 680 may further perform platform power management activities based on environmental and usage conditions. Still further, PMIC 680 may communicate control and status information to SoC 610 to cause various power management actions within SoC 610.

Still referring to FIG. 6, to provide for wireless capabilities, a WLAN unit 650 is coupled to SoC 610 and in turn to an antenna 655. In various implementations, WLAN unit 650 may provide for communication according to one or more wireless protocols, including an IEEE 802.11 protocol, a Bluetooth™ protocol or any other wireless protocol.

As further illustrated, a plurality of sensors 660 may couple to SoC 610. These sensors may include various accelerometer, environmental and other sensors, including user gesture sensors. Finally, an audio codec 665 is coupled to SoC 610 to provide an interface to an audio output device 670. Of course understand that while shown with this particular implementation in FIG. 6, many variations and alternatives are possible.

The following examples pertain to further embodiments.

In Example 1, a SoC comprises: a single core to execute a legacy instruction set, where the single core is configured to enter a SMM to provide a TEE to perform at least one secure operation; and a memory controller coupled to the single core, the memory controller to interface with a system memory, where a portion of the system memory comprises a secure memory for the SMM, and the single core is to authenticate a boot firmware, execute the boot firmware, and pass control to the SMM to obtain a key pair from a protected storage and store the key pair in the secure memory.

In Example 2, the single core is to operate in the SMM to obtain the key pair from the protected storage comprising a non-volatile storage including an isolated key store to store the key pair, where the key pair is to be generated and stored in the non-volatile storage during manufacture of a system including the SoC.

In Example 3, the secure memory is optionally to be reset on reset of the SoC such that the key pair is deleted, the secure memory to be isolated from access outside of the SMM.

In Example 4, the SoC of any of the above Examples, in the TEE, is to emulate at least one security instruction of an instruction set unsupported by the single core.

In Example 5, the SoC of any of the above Examples, in the TEE, is to receive encrypted content, decrypt the encrypted content using one or more derived keys stored in an unprotected storage coupled to the SoC, and output the decrypted content to an output device via a trusted channel.

In Example 6, the SoC of any of the above Examples, in the TEE is to encrypt a page of information stored in the secure memory and store the encrypted page in an unprotected portion of the system memory.

In Example 7, the single core comprises the only core of the SoC, the SoC further comprising a boot ROM to store the key pair in a protected portion of the boot ROM.

In Example 8, the single core of any of the above Examples is to pass execution from the SMM to an operating system to be booted after the key pair is stored in the secure memory.

Note that the above SoC can be implemented using various means.

In an example, the SoC may be incorporated in a user equipment touch-enabled device.

In another example, a system comprises a display and a memory, and includes the SoC of one or more of the above Examples.

In Example 9, at least one computer readable medium includes instructions that when executed cause a system to: execute at least a portion of a firmware of a pre-boot environment in a single core of a processor to create a trusted portion of a system memory; and transfer execution to a trusted agent associated with the trusted portion, request a key pair from a protected portion of a non-volatile storage, store the key pair in the trusted portion of the system memory, and thereafter transfer execution from the trusted agent to an operating system.

In Example 10, the at least one computer readable medium of Example 9 optionally further comprises instructions that when executed enable the system to receive a trusted action request from a non-trusted agent, and if the trusted action request is supported by the trusted agent, enter a trusted execution environment via the trusted agent to execute a secure operation corresponding to the trusted action request in the trusted execution environment.

In Example 11, the at least one computer readable medium of Example 9 optionally further comprises instructions that when executed enable the system to request the key pair from the protected portion of the non-volatile memory responsive to an IN_SMM instruction executed by the single core, while in a trusted execution environment.

In Example 12, the at least one computer readable medium of Example 9 optionally further comprises instructions that when executed enable the system to emulate at least one security instruction of an instruction set unsupported by the single core while in the trusted execution environment.

In Example 13, the at least one computer readable medium of Example 9 optionally further comprises instructions that when executed enable the system to receive encrypted content, decrypt the encrypted content using one or more derived keys stored in the system memory, and output the decrypted content to an output device via a trusted channel.

In Example 14, the at least one computer readable medium of Example 9 optionally further comprises instructions that when executed enable the system to encrypt a page of information stored in the trusted portion of the system memory and store the encrypted page in an unprotected portion of the system memory.

In Example 15, a system comprises: a processor having a single core to execute a legacy instruction set, where the single core is configured to enter a SMM to instantiate a TEE, the single core further having a secure storage and a memory controller to interface with a memory, where the memory comprises a secure portion for the SMM, and where the single core is to authenticate a boot firmware, execute the boot firmware, and pass control to the SMM to obtain an endorsement key from the secure storage and store the endorsement key in the secure portion of the memory; a display device coupled to the processor, the display device including a frame buffer to store processed data to be displayed on the display device; and the memory coupled to the processor, the memory including the secure portion to store the endorsement key and an unprotected portion to store one or more decryption keys, where in the TEE the processor is to receive encrypted content, decrypt the encrypted content using the one or more decryption keys, and output the decrypted content to the display device.

In Example 16, the display device is coupled to the processor via a trusted channel, where the processor is to execute a display driver in the TEE to pass the processed data to the display device for storage in the frame buffer.

In Example 17, the endorsement key comprises a storage root key, the processor to use the storage root key to encrypt the one or more decryption keys prior to storage in the unprotected portion of the memory.

In Example 18, the secure storage comprises an on-chip ROM to store at least a portion of the boot firmware.

In Example 19, the secure storage comprises a set of programmable fuses of the processor.

In Example 20, in the TEE, the processor is to encrypt a page of information stored in the secure portion of the memory and store the encrypted page in the unprotected portion of the memory.

In Example 21, a method comprises: executing at least a portion of a firmware of a pre-boot environment in a single core of a processor to create a trusted portion of a system memory; and transferring execution to a trusted agent associated with the trusted portion, requesting a key pair from a protected portion of a non-volatile storage, storing the key pair in the trusted portion of the system memory, and thereafter transferring execution from the trusted agent to an operating system.

In Example 22, the method of Example 21 further comprises receiving a trusted action request from a non-trusted agent, and if the trusted action request is supported by the trusted agent, entering a trusted execution environment via the trusted agent to execute a secure operation corresponding to the trusted action request in the trusted execution environment.

In Example 23, the method of Example 21 further comprises requesting the key pair from the protected portion of the non-volatile memory responsive to an IN SMM instruction executed by the single core, while in a trusted execution environment.

In Example 24, the method of Example 21 further comprises emulating at least one security instruction of an instruction set unsupported by the single core while in the trusted execution environment.

In Example 25, the method of Example 21 further comprises receiving encrypted content, decrypting the encrypted content using one or more derived keys stored in the system memory, and outputting the decrypted content to an output device via a trusted channel.

In Example 26, the method of Example 21 further comprises encrypting a page of information stored in the trusted portion of the system memory and storing the encrypted page in an unprotected portion of the system memory.

In Example 27, an apparatus comprises means to perform a method of any one of the above Examples.

In Example 28, a machine-readable storage medium includes machine-readable instructions, when executed, to implement a method of any of the above Examples.

In Example 29, a system comprises: means for executing at least a portion of a firmware of a pre-boot environment in a single core of a processor to create a trusted portion of a system memory; means for transferring execution to a trusted agent associated with the trusted portion; means for requesting a key pair from a protected portion of a non-volatile storage; means for storing the key pair in the trusted portion of the system memory; and means for transferring execution from the trusted agent to an operating system.

In Example 30, the system of Example 29 further comprises means for receiving a trusted action request from a non-trusted agent, and if the trusted action request is supported by the trusted agent, means for entering a trusted execution environment via the trusted agent to execute a secure operation corresponding to the trusted action request in the trusted execution environment.

In Example 31, the system of Example 29 further comprises means for requesting the key pair from the protected portion of the non-volatile memory responsive to an IN SMM instruction executed by the single core, while in a trusted execution environment.

In Example 32, the system of Example 29 further comprises: means for receiving encrypted content; means for decrypting the encrypted content using one or more derived keys stored in the system memory; and means for outputting the decrypted content to an output device via a trusted channel.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A system on a chip (SoC) comprising:
a single core to execute a legacy instruction set, wherein the single core comprises the only core of the SoC, and wherein the single core is configured to enter a system management mode (SMM) to provide a trusted execution environment (TEE) to perform at least one secure operation, wherein in the TEE, the single core is to emulate at least one security instruction of an instruction set unsupported by the single core; and
a memory controller coupled to the single core, the memory controller to interface with a system memory, wherein a portion of the system memory comprises a secure memory for the SMM, and wherein the single core is to authenticate a boot firmware, execute the boot firmware, and pass control to the SMM to obtain a key pair from a protected storage and store the key pair in the secure memory.

2. The SoC of claim 1, wherein the single core is to operate in the SMM to obtain the key pair from the protected storage comprising a non-volatile storage including an isolated key store to store the key pair, wherein the key pair is to be generated and stored in the non-volatile storage during manufacture of a system including the SoC.

3. The SoC of claim 2, wherein the secure memory is to be reset on reset of the SoC such that the key pair is deleted, the secure memory to be isolated from access outside of the SMM.

4. The SoC of claim 1, wherein in the TEE, the single core is to receive encrypted content, decrypt the encrypted content using one or more derived keys stored in an unprotected storage coupled to the SoC, and output the decrypted content to an output device via a trusted channel.

5. The SoC of claim 1, wherein in the TEE, the single core is to encrypt a page of information stored in the secure memory and store the encrypted page in an unprotected portion of the system memory.

6. The SoC of claim 1, wherein the SoC further comprises a boot read only memory (ROM) to store the key pair in a protected portion of the boot ROM.

7. The SoC of claim 1, wherein the single core is to pass execution from the SMM to an operating system to be booted after the key pair is stored in the secure memory.

8. At least one computer non-transitory readable medium including instructions that when executed cause a system to:
   execute at least a portion of a firmware of a pre-boot environment in a single core of a processor to create a trusted portion of a system memory, wherein the single core comprises the only core of a system on a chip (SOC);
   transfer execution to a trusted agent associated with the trusted portion;
   enter a trusted execution environment via the trusted agent;
   emulate at least one security instruction of an instruction set unsupported by the single core while in the trusted execution environment;
   request a key pair from a protected portion of a non-volatile storage, store the key pair in the trusted portion of the system memory, and thereafter transfer execution from the trusted agent to an operating system.

9. The at least one computer readable medium of claim 8, further comprising instructions that when executed enable the system to receive a trusted action request from a non-trusted agent, and if the trusted action request is supported by the trusted agent, execute a secure operation corresponding to the trusted action request in the trusted execution environment.

10. The at least one computer readable medium of claim 8, further comprising instructions that when executed enable the system to request the key pair from the protected portion of the non-volatile memory responsive to an $IN_{13}$ SMM instruction executed by the single core, while in a trusted execution environment.

11. The at least one computer readable medium of claim 8, further comprising instructions that when executed enable the system to receive encrypted content, decrypt the encrypted content using one or more derived keys stored in the system memory, and output the decrypted content to an output device via a trusted channel.

12. The at least one computer readable medium of claim 8, further comprising instructions that when executed enable the system to encrypt a page of information stored in the trusted portion of the system memory and store the encrypted page in an unprotected portion of the system memory.

13. A system comprising:
   a processor having a single core to execute a legacy instruction set, wherein the single core comprises the only core of the processor, and wherein the single core is configured to enter a system management mode (SMM) to instantiate a trusted execution environment (TEE), the single core further having a secure storage and a memory controller to interface with a memory, wherein the memory comprises a secure portion for the SMM, and wherein the single core is to authenticate a boot firmware, execute the boot firmware, and pass control to the SMM to obtain an endorsement key from the secure storage and store the endorsement key in the secure portion of the memory, and wherein in the TEE, the single core is to emulate at least one security instruction of an instruction set unsupported by the single core;
   a display device coupled to the processor, the display device including a frame buffer to store processed data to be displayed on the display device; and
   the memory coupled to the processor, the memory including the secure portion to store the endorsement key and an unprotected portion to store one or more decryption keys, wherein in the TEE the processor is to receive encrypted content, decrypt the encrypted content using the one or more decryption keys, and output the decrypted content to the display device.

14. The system of claim 13, wherein the display device is coupled to the processor via a trusted channel, wherein the processor is to execute a display driver in the TEE to pass the processed data to the display device for storage in the frame buffer.

15. The system of claim 13, wherein the endorsement key comprises a storage root key, the processor to use the storage root key to encrypt the one or more decryption keys prior to storage in the unprotected portion of the memory.

16. The system of claim 14, wherein the secure storage comprises an on-chip read only memory (ROM), the on-chip ROM further to store at least a portion of the boot firmware.

17. The system of claim 14, wherein the secure storage comprises a set of programmable fuses of the processor.

18. The system of claim 14, wherein in the TEE, the processor is to encrypt a page of information stored in the secure portion of the memory and store the encrypted page in the unprotected portion of the memory.

* * * * *